United States Patent
Tripathi et al.

(10) Patent No.: US 8,400,917 B2
(45) Date of Patent: Mar. 19, 2013

(54) METHOD AND SYSTEM FOR LOAD BALANCING USING QUEUED PACKET INFORMATION

(75) Inventors: Sunay Tripathi, Palo Alto, CA (US); Erik Nordmark, Mountain View, CA (US); Nicolas G. Droux, Rio Rancho, NM (US)

(73) Assignee: Oracle America, Inc., Redwood Shores, CA (US)

( * ) Notice: Subject to any disclaimer, the term of this patent is extended or adjusted under 35 U.S.C. 154(b) by 326 days.

(21) Appl. No.: 12/846,263

(22) Filed: Jul. 29, 2010

(65) Prior Publication Data

US 2011/0019553 A1 Jan. 27, 2011

Related U.S. Application Data

(63) Continuation of application No. 12/053,676, filed on Mar. 24, 2008, now Pat. No. 7,826,359.

(51) Int. Cl.
*H04L 12/24* (2006.01)
(52) U.S. Cl. ............................................. 370/230
(58) Field of Classification Search ................... 370/230
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 2003/0037154 A1 | 2/2003 | Poggio et al. | |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |
| 2005/0138620 A1 | 6/2005 | Lewites | |
| 2006/0041667 A1 | 2/2006 | Ahn et al. | |
| 2006/0045089 A1 | 3/2006 | Bacher et al. | |
| 2006/0070066 A1 | 3/2006 | Grobman | |
| 2006/0174324 A1 | 8/2006 | Zur et al. | |
| 2009/0204723 A1* | 8/2009 | Tonsing et al. | ............... 709/238 |

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

Tripathi, S.; "CrossBow: Solaris Network Virtualization and Resource Control"; Crossbow Architectual Document, Nov. 21, 2006; 19 pages.

Nordmark, E. et al. ; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

(Continued)

*Primary Examiner* — Melvin Marcelo
(74) *Attorney, Agent, or Firm* — Osha Liang LLP

(57) ABSTRACT

A computer readable medium including instructions executable by a processor to perform a method, the method including obtaining a packet by a load balancer, obtaining queued packet information for a plurality of target hosts operatively connected to the load balancer, selecting the one of the plurality of target hosts using the queued packet information, and sending the packet to the selected target host using a first communication channel between the load balancer and the selected target host.

13 Claims, 6 Drawing Sheets

OTHER PUBLICATIONS

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zones"; presented at the SVOSUG meeting, Oct. 26, 2006; 28 pages.

Tripathi, S.; "CrossBow: Network Virtualization and Resource Control"; presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 23 pages.

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 pages).

* cited by examiner

METHOD AND SYSTEM FOR LOAD BALANCING USING QUEUED PACKET INFORMATION

CROSS-REFERENCE TO RELATED APPLICATIONS

This application is a continuation of U.S. patent application Ser. No. 12/053,676, entitled: "METHOD AND SYSTEM FOR LOAD BALANCING USING QUEUED PACKET INFORMATION", and filed on Mar. 24, 2008. Further, this application claims benefit from U.S. patent application Ser. No. 12/053,676 under 35 U.S.C. §120, which is hereby incorporated by reference in its entirety.

The present application contains subject matter that may be related to the subject matter in the following commonly-owned U.S. applications: U.S. Pat. No. 7,885,257, entitled "Multiple Virtual Network Stack Instances using Virtual Network Interface Cards," in the names of Nicolas G. Droux, Erik Nordmark, and Sunay Tripathi; U.S. Pat. No. 7,613,132, entitled "Method and System for Controlling Virtual Machine Bandwidth" in the names of Sunay Tripathi, Tim P. Marsland, and Nicolas G. Droux; and U.S. Pat. No. 7,643,482, entitled "Virtual Switch," in the names of Nicolas G. Droux, Sunay Tripathi, and Erik Nordmark.

The present application contains subject matter that may be related to the subject matter in the following U.S. applications filed on Dec. 10, 2007, and assigned to the assignee of the present application: "Method and System for Creating a Virtual Network Path" with U.S. Pat. No. 7,945,647; "Method and System for Controlling Network Traffic In a Blade" with U.S. Patent Publication No. 2009/0150883 A1; "Method and System for Reconfiguring a Virtual Network Path" with U.S. Pat. No. 7,984,123; "Method and System for Enforcing Resource Constraints For Virtual Machines Across Migration" with U.S. Pat. No. 7,962,587; and "Method and System for Monitoring Virtual Wires" with U.S. Pat. No. 8,086,739.

The present application contains subject matter that may be related to the subject matter in the following U.S. applications filed on Feb. 29, 2008, and assigned to the assignee of the present application: "Method and System for Transferring Packets to a Guest Operating System" with U.S. Patent Publication No. 2009/0219935 A1 and "Method and System for Media-Based Data Transfer" with U.S. Pat. No. 7,970,951.

BACKGROUND

In many computing environments, clients (e.g., computer systems and users) connect to computers (e.g., servers) hosting an application or service (e.g., electronic mail, a website, etc.). A given computer, however, is only capable of satisfying the needs of a limited number of clients at any given time. In view of this, multiple instances of the application and/or service may be deployed across multiple computers in the network. In such cases, a client may send a request to the application. The request, prior to reaching the application, is intercepted by a load balancer. The load balancer is an application configured to distribute the requests for the application across all servers which include an instance of the application. The manner in which the requests are distributed is set by the load balancer. Once the load balancer make the selection, the request is sent to the selected server and subsequently serviced by the instance of the application on the selected server.

SUMMARY

In general, in one aspect, the invention relates to a computer readable medium including instructions executable by a processor to perform a method, the method including obtaining a packet by a load balancer, obtaining queued packet information for a plurality of target hosts operatively connected to the load balancer, selecting the one of the plurality of target hosts using the queued packet information, and sending the packet to the selected target host using a first communication channel between the load balancer and the selected target host.

In general, in one aspect, the invention relates to a system including a chassis interconnect, a physical network interface, a first computer, a second computer, and a third computer communicatively coupled with each other via the chassis interconnect, where the first computer, the second computer, and the third computer share the physical network interface (NIC), and where the first computer comprises a load balancer, a first virtual network interface card (VNIC), and a second VNIC, where the second computer comprises first target host and a fourth VNIC, and where the third computer comprises a second target host and a fifth VNIC. The system further includes a network express manager configured to implement a first virtual wire, a second virtual wire, and a third virtual wire using a virtual switching table, wherein the first virtual wire connects the physical NIC to the first VNIC, wherein the second virtual wire connects the second VNIC to the forth VNIC, and wherein the third virtual wire connects the third VNIC to the fifth VNIC. The load balancer is configured to obtain a packet from the physical NIC, obtain queued packet information for the first and second target hosts, select the first target host using the queued packet information, and send the packet to the first target host using the second virtual wire.

In general, in one aspect, the invention relates to a system. The system includes a first computer including a load balancer, a first physical network interface card (NIC), a second physical NIC, a first virtual network interface card (VNIC), a second VNIC, and a third VNIC. The system further includes a second computer including a third physical NIC, first target host and a fourth VNIC, and a third computer including a fourth physical NIC, second target host and a fifth VNIC. The load balancer is configured to obtain a packet from the first physical NIC, obtain queued packet information for the first and second target hosts, select the first target host using the queued packet information and send the packet to the first target host using the second physical NIC, the third physical NIC, the second VNIC, and the fourth VNIC.

Other aspects of the invention will be apparent from the following description and the appended claims.

DETAILED DESCRIPTION

Figure 1:
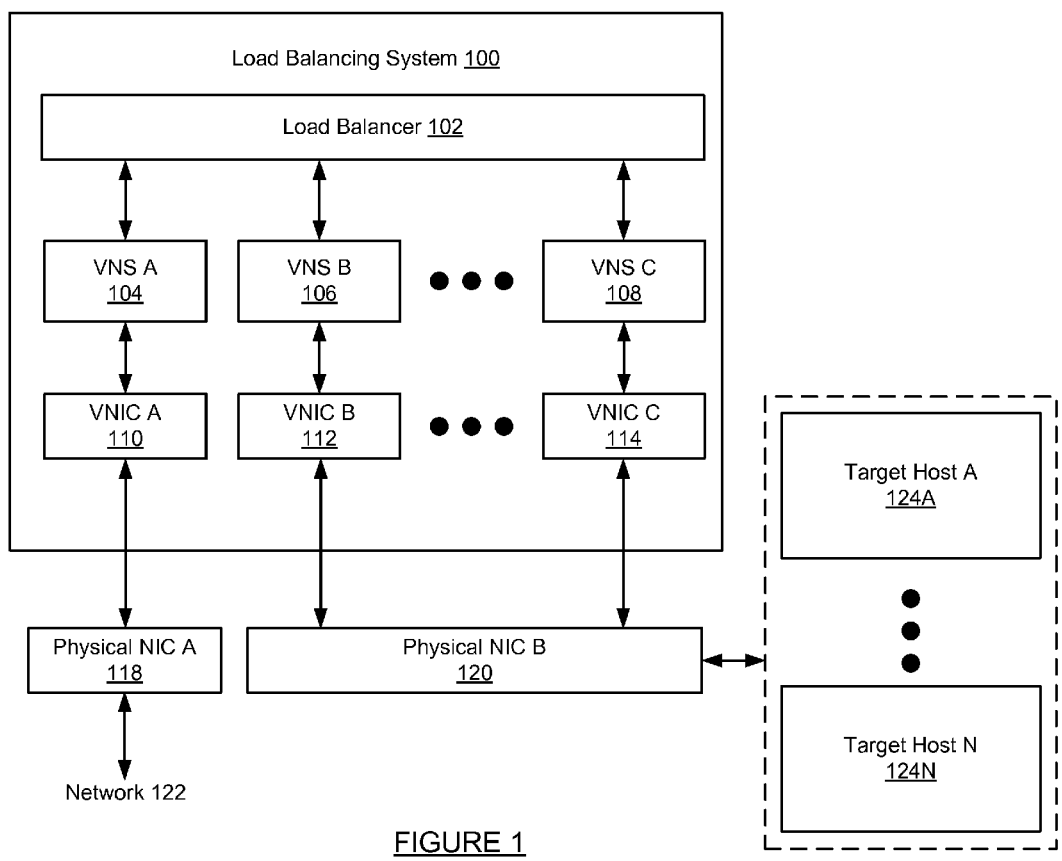
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for load balancing using queued packet information. More specifically, when a packet is received by the load balancer, the selection of the target host is based (at least in part) on the number of queued packets in the target host waiting to be processed.

FIG. 1 shows a system in accordance with one or more embodiments of the invention. In one embodiment of the invention, the system includes a load balancing system (100) operatively connected to one or more target hosts (124A, 124N). The load balancing system (100) is described below with reference to FIG. 1. The target hosts (124A, 124N) are described below with reference to FIG. 2.

Referring to FIG. 1, the load balancing system (100) includes two physical network interface cards (NICs) (118, 120). Physical NIC A (118) is configured to receive packets from a network (122). In one embodiment of the invention, the network may correspond to a local area network (LAN), a wide area network (WAN), the Internet, or any combination thereof. The network (122) provides a medium over which client requests (in the form of packets) for applications and/or services (not shown) executing on the target hosts (124A, 124N) are communicated. The network (122) and physical NIC A (118) may be connected using a wired connection, a wireless connection, or any combination thereof.

Continuing with the discussion of FIG. 1, physical NIC B (120) is configured to send and receive packets from the target hosts (124A, 124N). The target hosts (124A, 124N) and physical NIC B (120) may be connected over a network (such as the one described above) using a wired connection, a wireless connection, or any combination thereof.

The load balancing system (100) includes a load balancer (102), virtual network stacks (VNSs) (104, 106, 108), and virtual network interface cards (VNICs) (110, 112, 114). Each of these components is described below.

In one embodiment of the invention, the load balancer (102) is an application executing in the load balancing system (100) configured to select one of the target hosts (124A, 124N) to forward received packets (i.e., packets received from physical NIC A (118). The load balancer (100) is configured to make this selection using queued packet information (described below).

In one embodiment of the invention, the load balancer (102) inherits network connectivity via the VNICs (110, 112, 114). To the load balancer (102), the VNICs appear as physical NICs. In one or more embodiments of the invention, the load balancer (102) may be associated with an arbitrary number of VNICs. VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety. VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux, the contents of which are hereby incorporated by reference in their entirety.

Continuing with the discussion of FIG. 1, each of the VNICs (110, 112, 114) is operatively connected to a VNS (104, 106, 108). VNSs are described in FIG. 4. Further, each of the VNSs (104, 106, 108) is operatively connected to load balancer (102). Thus, packets received from the network (122) pass through physical NIC A (118), VNIC A (110), VNS A (104), and are eventually received by the load balancer (102). Further, packets sent from the load balancer (102) to the target hosts (124A, 124N) pass through another VNS (e.g., VNS B (106), VNS C (108)) and a corresponding VNIC (e.g., VNIC B (112), VNIC C (114)).

In one embodiment of the invention, physical NIC B (120) may include a hardware classifier (not shown). In such cases, packets received by physical NIC B (120) from the target hosts (124A, 124N) are classified based on the source of packet (i.e., the source within the target host) and sent to the appropriate VNIC (112, 114) in the load balancing system (100). Alternatively, physical NIC B (120) may not have functionality to perform the aforementioned classification. In such cases, the load balancing system (100) may include a software classifier (not shown) interposed between physical NIC B (120) and the VNICs (e.g., VNIC B (112), VNIC C (114)) and configured to receive packets from the physical NIC B (120) and perform the aforementioned classification. Those skilled in the art will appreciate that one or more physical NICs operatively connected to the load balancing system may include a hardware classifier.

Figure 2:
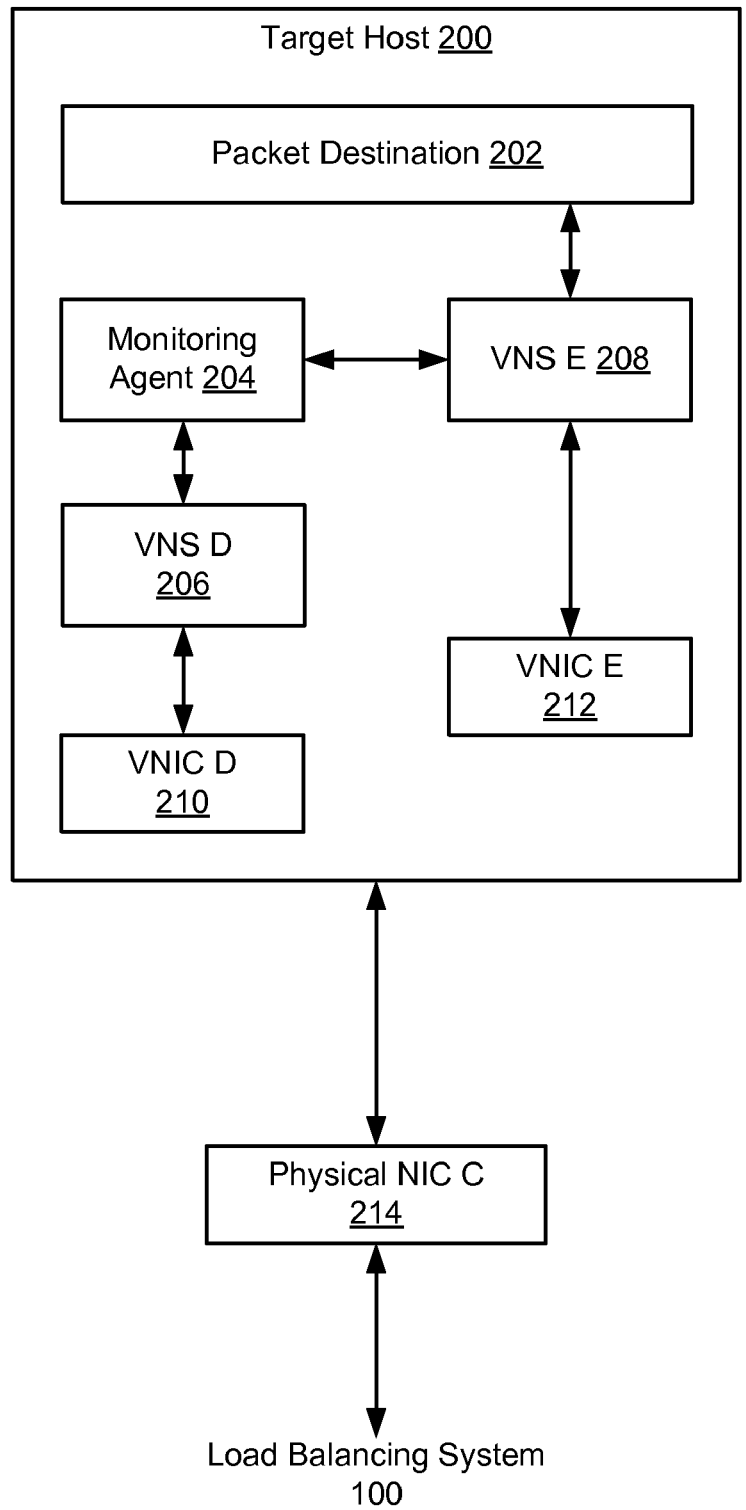
FIG. 2 shows a target host in accordance with one or more embodiments of the invention.

FIG. 2 shows a target host in accordance with one or more embodiments of the invention. The target host (200) is operatively connected to physical NIC C (214). In one embodiment of the invention, physical NIC C (214) may include a hardware classifier. In such cases, packets received by physical NIC C (214) from the load balancing system (100) are classified based on the source of packet (i.e., the source within the target host) and sent to the appropriate VNIC (210, 212) in the target host (200). Alternatively, physical NIC C (214) may not have functionality to perform the aforementioned classification. In such cases, the target host (200) may include a software classifier (not shown) interposed between physical NIC C (214) and the VNICs (e.g., VNIC D (210), VNIC E (212)) and configured to receive packets from the physical NIC C (214) and perform the aforementioned classification.

In one embodiment of the invention, the packet destination (202) corresponds to a service (e.g., a web service) or an application executing on the target host (200). In one embodiment of the invention, the packet destination (202) may be executing directly on the target host operating system. Alternatively, the packet destination may be executing within a virtual machine or virtual execution environment executing on the target host operating system.

Broadly speaking, the virtual machines are distinct operating environments configured to inherit underlying functionality of the target host operating system via an abstraction layer. In one or more embodiments of the invention, each virtual machine includes a separate instance of an operating system. For example, the Xen® virtualization project allows for multiple guest operating systems executing in a host operating system. Xen® is a trademark overseen by the Xen Project Advisory Board. In one embodiment of the invention, the target host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one embodiment of the invention, the target host operating system may include both virtual machines and virtual execution environments.

Continuing with the discussion of FIG. 2, the packet destination (202) is configured to receive packets from a VNS (VNS E (208)), where the VNS receives packets from an associated VNIC (VNIC E (212)). In one embodiment of the invention, once a packet is received by the VNS (VNS E (208)) the packet may be placed in the VNS (VNS E (208)) and await processing. In one embodiment of the invention, a monitoring agent (204) in the target host (200) is configured to monitor the number of packets queued in the VNS (VNS E (208)) (i.e., the queued packet information) and communicate this information to the load balancing system (100). In one embodiment of the invention, the monitoring agent (204) may be configured to obtain the queued packet information at a set interval. The monitoring agent (204) may be configured to periodically communicate the queued packet information to the load balancing system (100). Alternatively (or in addition to), the monitoring agent (204) may be configured to send the queued packet information to the load balancing system (100) in response to a request from the load balancing system (100).

In one embodiment of the invention, the monitoring agent (204) is associated with a separate VNS (VNS D (206)), which is connected to a separate VNIC (VNIC D (210)). In the embodiment of the invention described above, the queued packet information is communicated to the load balancing system (100) using a separate network path (i.e., using different VNICs and VNS) from the network path used to communicate packets from the load balancing system (100) to the packet destination (202).

In one embodiment of the invention, the packets communicated from the monitoring agent (204) to the loading balancing system (100) are processed at a higher priority (e.g., preferentially or before) by the load balancing system (100) as compared to packets communicated between the packet destination (202) and the load balancing system (100). In one embodiment of the invention, processing the packets sent from the monitoring agent (204) at a higher priority level includes transferring the packets from physical NIC B (120) into the memory of the load balancing system (100) before transferring packets from the packet destination (202) to load balancing system (100) into the memory of the load balancing system (100). In one embodiment of the invention, the priority of processing packets is extended to packets communicated from the loading balancing system (100) to the monitoring agent (204) and the packet destination (200). In such cases, the packets sent to the monitoring agent (204) are transferred into the memory of the target host (200) prior to transferring packets sent to the packet destination (202) in to the memory of the target host (200).

In one embodiment of the invention, the higher processing priority of queued packet information (along with associated requests for such information) allows the load balancer to more efficiently obtain up-to-date information necessary to select an appropriate target host to send the received packets.

Those skilled in the art will appreciate that while FIG. 2 shows a monitoring agent (204) with a separate VNS and VNIC, the monitoring agent may also share the same VNIC and VNS as the packet destination.

Figure 3:
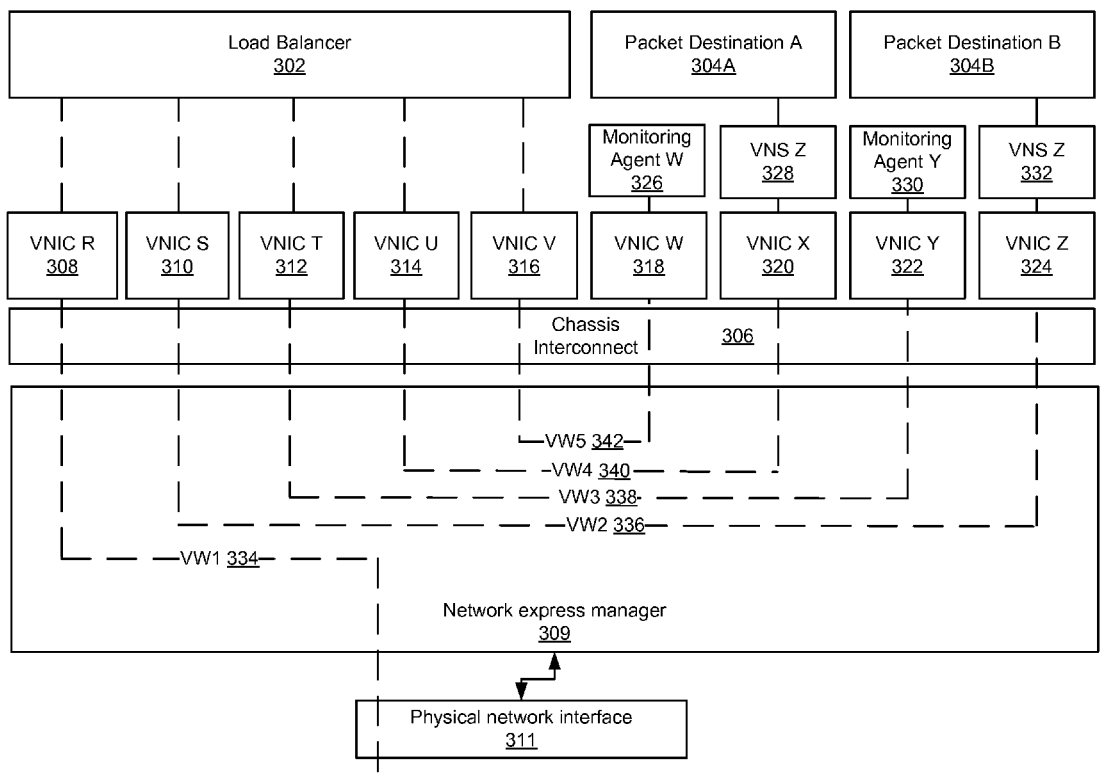
FIG. 3 shows a system in accordance with one or more embodiments of the invention.

FIGS. 1 and 2 are directed to embodiments in which the load balancing system and the target hosts are located on separate computer systems and operatively connected via a wired and/or wireless network. FIG. 3 is directed to embodiments in which the load balancer and packet destinations are located on blades connected to a blade chassis.

Referring to FIG. 3, FIG. 3 shows a system in accordance with one or more embodiments of the invention. The system includes a load balancer (302), packet destination A (304A) and packet destination B (304B) each located on a separate blade within a blade chassis. The blades on which the packet destinations are located also include monitoring agents (326, 330) to monitor the corresponding VNSs (328, 332).

For ease of illustration, the blade chassis and the blades themselves are not included in FIG. 3. Further, only the VNSs required for the understanding of the invention are shown in FIG. 3, the remaining VNS have been omitted for ease of illustration.

Continuing with the discussion of FIG. 3, "Blade" is a term of art referring to a computer system located within a blade chassis. Blades typically include fewer components than stand-alone computer systems or conventional servers. In one embodiment of the invention, fully featured stand-alone computer systems or conventional servers may also be used instead of or in combination with the blades. Generally, blades in a blade chassis each include one or more processors and associated memory. Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

The blade chassis (now shown) includes multiple blades (not shown) communicatively coupled with a chassis interconnect (306). For example, the blade chassis may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis. BladeCenter® is a registered trademark of International Business Machines, Inc. (IBM), headquartered in Armonk, N.Y.

In one or more embodiments of the invention, the blades are configured to communicate with each other via the chassis interconnect (306). Thus, the blade chassis allows for communication between the blades without requiring traditional network wires (such as Ethernet cables) between the blades. For example, depending on the type of blade chassis, the chassis interconnect (306) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 3, to communicate with clients outside the blade chassis, the blades are configured to share a physical network interface (311). The physical network interface (311) includes one or more network ports (for example, Ethernet ports), and provides an interface between the blade chassis and the network (i.e., interconnected computer systems external to the blade chassis) to which the blade chassis is connected. The blade chassis may be connected to multiple networks, for example, using multiple network ports.

In one or more embodiments, the physical network interface (311) is managed by a network express manager (309). Specifically, the network express manager (309) is configured to manage access by the blades to the physical network interface (311). The network express manager (309) may also be configured to manage internal communications between the blades themselves, in a manner discussed in detail below. The network express manager (309) may be any combination of hardware, software, and/or firmware including executable logic for managing network traffic.

In one embodiment of the invention, the network express manager (309) is configured to route network traffic traveling to and from VNICs located in the blades. Specifically, the network express manager (309) includes a virtual switching table (not shown), which includes a mapping of VNIC identifiers to VNIC locations in the chassis interconnect (306). In one or more embodiments, the VNIC identifiers are Internet Protocol (IP) addresses, and the VNIC locations are PCI-E endpoints associated with the blades (e.g., if the chassis interconnect is a PCI-E backplane). Alternatively, another routing scheme may be used.

In one or more embodiments, the network express manager (309) is configured to receive network traffic via the physical network interface and route the network traffic to the appropriate location (i.e., where the VNIC is located) using the virtual switching table (not shown). Further, the network express manager (309) may be configured to route network traffic between different VNICs located in the blade chassis. In one or more embodiments of the invention, using the virtual switching table (not shown) in this manner facilitates the creation of a virtual network path, which includes virtual wires. Thus, using the virtual switching table (not shown), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (not shown) to reflect the corresponding VNIC's new physical location (for example, a different PCI-E endpoint).

The load balancer (302), packet destinations (304A, 304B), and the monitoring agents (326, 330) communicate with each other using VNICs (310-324). More specifically, the VNICs (310-324) are used to create virtual wires between the aforementioned components in order to facilitate communication between the various components.

In particular, a first virtual wire (VW1) (334) connects physical network interface (311) with VNIC R (308), a second virtual wire (VW2) (336) connects VNIC S (310) with VNIC Z (324), a third virtual wire (VW3) (338) connects VNIC T (312) with VNIC Y (322), a fourth virtual wire (VW4) (340) connects VNIC U (314) with VNIC X (320), and a fifth virtual wire (VW5) (342) connects VNIC V (316) with VNIC W (318).

VW1 (334) enables the transfer of client requests (in the form of packets) from the physical network interface (311) to the load balancer (302). VW2 (336) enables the transfer of packets from the load balancer (302) to packet destination B (304B). VW3 (338) enables the transfer of queued packet information between monitoring agent Y (330) and the load balancer (302). VW4 (340) enables the transfer of packets from the load balancer (302) to packet destination A (304A). VW5 (342) enables the transfer of queued packet information between monitoring agent W (318) and the load balancer (302).

In one embodiment of the invention, packets communicated over VW3 (338) are processed at a higher priority (e.g., before or preferentially) than packets communicated over VW2 (310).

Figure 4:
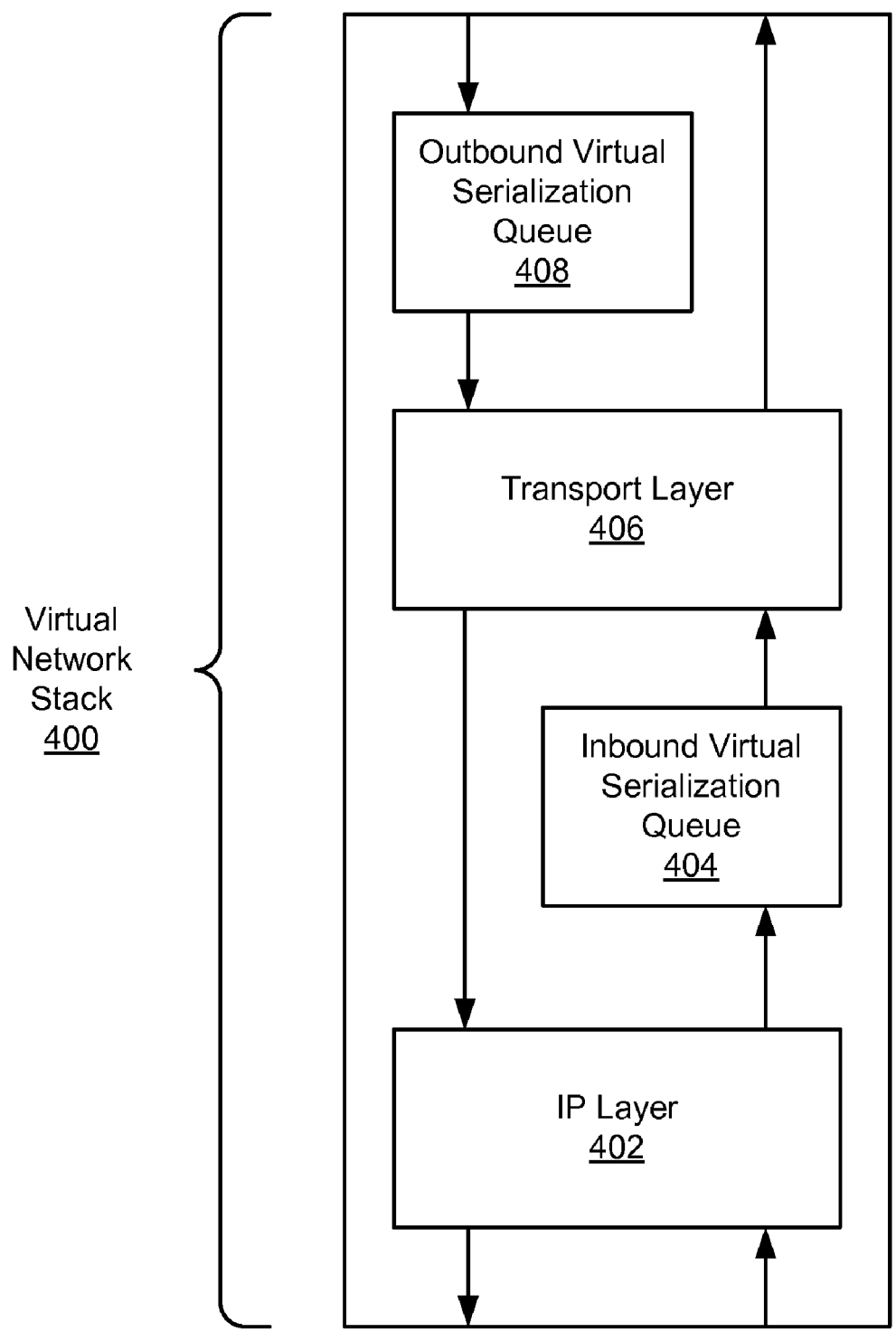
FIG. 4 shows a virtual network stack in accordance with one or more embodiments of the invention.

FIG. 4 shows a virtual network stack (VNS) in accordance with one embodiment of the invention. In one embodiment of the invention, the VNS (400) includes an Internet Protocol (IP) layer (402), an inbound virtual serialization queue (VSQ) (404), a transport layer (406), and an outbound serialization queue (408). Each of the aforementioned components is discussed below.

In one embodiment, the IP layer (402) is configured to receive packets from the VNIC associated with the VNS (404) (e.g., VNS A (104) receives packets from VNIC A (110) in FIG. 1). Further, the IP layer (402) is configured to receive packets from the transport layer (406). In one embodiment of the invention, the IP layer (402) is configured to perform IP level processing for both inbound and outbound packets.

Continuing with the discussion of FIG. 4, the inbound VSQ (404) is configured to receive packets from the IP layer (402). The inbound VSQ (404) corresponds to a queue data structure and is configured to queue packets received from the IP layer (402) prior to the packets being processed by the transport layer (406). In one embodiment of the invention, the inbound VSQ (404) may be used to control the number of packets being received by the packet destination (e.g., 202 in FIG. 2) associated with VNS. The inbound VSQ (404) may control the bandwidth by limiting the number of packets in the VSQ (404) and preventing additional packets from entering the VNS (400) until the inbound VSQ (404) has less than a threshold number of packets.

In one embodiment of the invention, the transport layer (406) is configured to process inbound and outbound packets in accordance with Transmission Control Protocol (TCP), User Datagram Protocol (UDP), or both UDP and TCP. Other protocols may be supported by the transport layer (406).

In one embodiment of the invention, the outbound VSQ (408) is a queue data structure configured to receive packets from the packet destination with which the VNS (404) is associated. Further, the outbound VSQ (408) is configured to store packets prior to sending the received packets to the transport layer (406). In one embodiment of the invention, the outbound VSQ (408) is also configured to control the flow of packets from the packet destination associated with the VNS (404) to the VNS (400). In one embodiment of the invention, the outbound VSQ (408) (or a related process) is configured to block an application from sending packets to the outbound VSQ (408), if the packet destination (e.g., 132) is attempting to issue packets at a higher rate than the outbound bandwidth allocated to the packet destination. Further, the outbound VSQ (408) (or a related process) is configured to notify the packet destination when it is no longer blocked from issuing packets to the VNS (400).

In one embodiment of the invention, the inbound VSQ (404) and outbound VSQ (408) are each configured to enforce the manner in which packets are processed. Specifically, the inbound VSQ (404) and outbound VSQ (408) may be configured to enforce the packet processing requirements imposed by the transport layer (406). For example, TCP requires serial processing of packets. Thus, the inbound VSQ (404) and outbound VSQ (408) may require all threads accessing the inbound VSQ (404) and outbound VSQ (408) to conform to a mutual exclusion policy. In one embodiment of the invention, the mutual exclusion policy requires that only one thread may access the VSQ (inbound or outbound) at a time. Thus, if two threads are attempting to access a given VSQ (inbound or outbound), one thread must wait until the other thread has finished accessing the VSQ (inbound or outbound).

Alternatively, if the transport layer (406) only supports UDP, then the inbound VSQ (404) and outbound VSQ (408) may be configured to allow concurrent access. Said another way, two or more threads may concurrently access the VSQ (inbound or outbound). In one embodiment of the invention, if the transport layer (406) is configured to process both TCP and UDP packets, then the inbound VSQ (404) and outbound VSQ (408) are configured to conform to the more stringent standard (e.g., TCP if the transport layer supports both TCP and UDP).

In one embodiment of the invention, the inbound VSQ (404) and the outbound VSQ (408) are implemented as a single bi-directional VSQ. In such cases, the bi-directional VSQ includes a single set of configuration parameters (discussed above) to enforce the manner in which packets are processed. Further, the enforcement of the configuration parameters is performed on a VSQ-basis (as opposed to a per-direction basis). For example, if the bi-directional VSQ enforces a mutual exclusion policy, then only one thread may access the bi-directional VSQ at a time.

In one embodiment of the invention, the monitoring agent (e.g., 204 in FIG. 2) is configured to monitor the number of packets in the inbound VSQ (404). The number of packets in the inbound VSQ (404) corresponds to the queued packet information transmitted by the monitoring agent to the load balancer. In another embodiment of the invention, the monitoring agent (e.g., 204 in FIG. 2) is configured to monitor the number of packets in the inbound VSQ (404) as well as the number of packets in the outbound VSQ (408). In this embodiment, the aggregate number of packets in both VSQs (404, 408) corresponds to the queued packet information transmitted by the monitoring agent to the load balancer. In another embodiment of the invention, if a single bi-directional VSQ is used, then the number of packets in the inbound direction or in both the inbound and outbound directions may correspond to the queued packet information.

Figure 5:
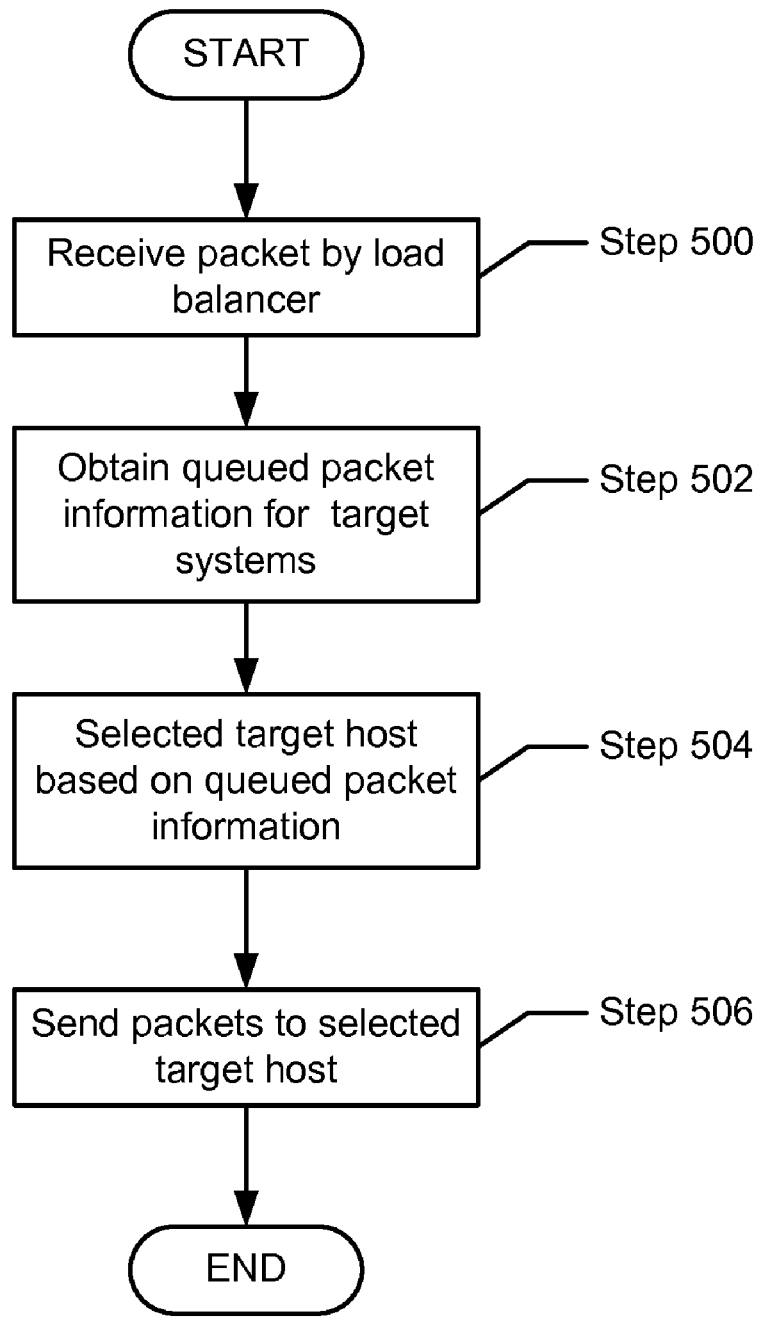
FIGS. 5-6 show flowcharts in accordance with one or more embodiments of the invention.

FIG. 5 shows a flowchart in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In Step 500, a packet is received by the load balancer. In one embodiment of the invention, the packet is received as part of a client request for an application or a service.

In Step 502, queued packet information is obtained from target hosts. In one embodiment of the invention, each of the target hosts includes an instance of the application or service necessary to respond to the client request. In one embodiment of the invention, obtaining the queued packet information includes sending a request to a monitoring agent located on each of the target hosts to obtain queued packet information for the corresponding target host. In another embodiment of the invention, obtaining the queued packet information is obtained by querying a data structure that includes the queued packet information for at least the target hosts. The aforementioned data structure may be populated using Steps 604-606 in FIG. 6 (described below).

In Step 504, the load balancer selects one of the target hosts using the queued packet information. In one embodiment of the invention, the target host with the lowest number of queued packets in the inbound VSQ is selected. Those skilled in the art will appreciate that the load balancer may apply a different policy to the queued packet information in order to select one of the target hosts. In Step 506, the packet is sent to the selected target host. In one embodiment of the invention, the method shown in FIG. 5 is performed for groups of packets as opposed to on a per-packet basis.

Figure 6:
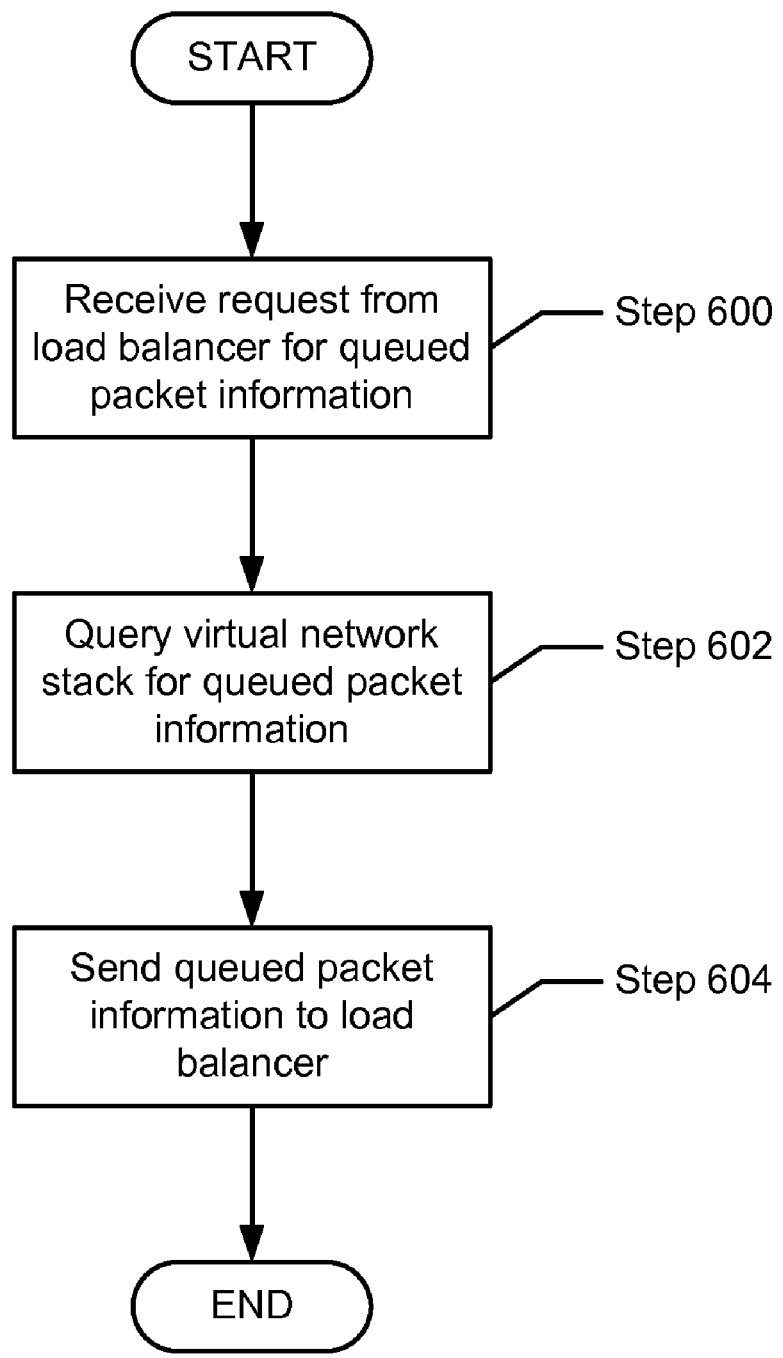

FIG. 6 shows a flowchart in accordance with one or more embodiments of the invention. In one or more embodiments of the invention, one or more of the steps shown in FIG. 6 may be omitted, repeated, and/or performed in a different order. Accordingly, embodiments of the invention should not be considered limited to the specific arrangement of steps shown in FIG. 6.

In Step 600, the monitoring agent receives a request from the load balancer for queued packet information. In Step 602, the monitoring agent queries the inbound VSQ (or another queue(s) in the corresponding VNS) to obtain the queued packet information. In Step 604, the monitoring agent sends the queued packet information to the load balancer. In one embodiment of the invention, Steps 604-606 may be performed automatically (i.e., without waiting for a request from the load balancer).

Those skilled in the art will appreciate that Step 604-606 and the method shown in FIG. 5 may be performed in parallel. For example, the monitoring agents may be configured to send queued packet information to the load balancer at regular time intervals. As discussed above, this information may then be stored in a data structure accessible to the load balancer. By allowing Steps 604-606 to be performed in parallel with FIG. 5, the load balancer has up-to-date information about the status of the target hosts and, as such, may more evenly balance the loads across the target hosts.

Those skilled in the art will appreciate that while certain embodiments of the invention have been described with respect to using blades, the invention may be extended for use with other computer systems, which are not blades. Specifically, the invention may be extended to any computer, which includes at least memory, a processor, and a mechanism to physically connect to and communicate over the chassis bus. Examples of such computers include, but are not limited to, multi-processor servers, network appliances, and lightweight computing devices (e.g., computers that only include memory, a processor, a mechanism to physically connect to and communicate over the chassis bus), and the necessary hardware to enable the aforementioned components to interact.

Further, those skilled in the art will appreciate that if one or more computers, which are not blades, are not used to implement the invention, then in one or more embodiments of the invention an appropriate chassis may be used in place of the blade chassis. However, those skilled in the art will appreciate that a chassis is not required to implement all embodiments of the invention.

Software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions executable by a processor to perform a method, the method comprising:
   obtaining a packet by a load balancer;
   obtaining queued packet information for a plurality of target hosts operatively connected to the load balancer, wherein obtaining the queued packet information comprises sending a request for the queued packet information to at least one of the plurality of target hosts and wherein the request is sent to the at least one of the plurality of target hosts using a second communication channel between the load balancer and the at least one of the plurality of target hosts;

selecting one of the plurality of target hosts using the queued packet information to identify a selected target host; and sending the packet to the selected target host using a first communication channel between the load balancer and the selected target host.

2. The non-transitory computer readable medium of claim 1, wherein the selected target host comprises a virtual network stack (VNS) and wherein the queued packet information comprises a number packets queued in the VNS.

3. The non-transitory computer readable medium of claim 2, wherein the VNS comprises an inbound virtual serialization queue (VSQ) interposed between an Internet Protocol (IP) layer and a Transport layer and wherein the queued packet information is the number of packets queued in the inbound VSQ.

4. The non-transitory computer readable medium of claim 1, wherein a response to the request is communicated to the load balancer using the second communication channel, wherein packets communicated on the second communication channel are processed at a higher priority level by a computer executing the load balancer than packets communicated on the first communication channel.

5. A system, comprising:
a processor;
a first physical network interface, communicatively coupled to a network;
a second physical network interface, communicatively coupled to a plurality of target hosts; and
a load balancer, configured to:
obtain a packet from the first physical network interface;
for each of the plurality of target hosts, send a request for queued packet information using a second communication channel between the load balancer and the each of the plurality of target hosts;
for each of the plurality of target hosts, receive queued packet information using the second communication channel;
select one of the plurality of target hosts using the queued packet information; and
send the packet to the one of the plurality of target hosts using a first communication channel between the load balancer and the one of the plurality of target hosts.

6. The system of claim 5, wherein packets communicated on the second communication channel are processed at a higher priority level by a computer executing the load balancer than packets communicated on the first communication channel.

7. The system of claim 5, wherein the packet is received by the first physical network interface from the network.

8. The system of claim 5, wherein each of the plurality of target hosts comprises a virtual network stack (VNS).

9. The system of claim 8, wherein, for each of the plurality of target hosts, the queued packet information comprises a number of packets queued in the VNS.

10. The system of claim 8, wherein the VNS comprises an inbound virtual serialization queue (VSQ) interposed between an Internet Protocol (IP) layer and a Transport layer, and wherein the queued packet information is the number of packets queued in the inbound VSQ.

11. The system of claim 8, wherein each of the plurality of target hosts further comprises a virtual network interface (VNIC).

12. The system of claim 5, further comprising:
a first VNS interposed between the first physical interface and the load balancer; and
a second VNS interposed between the second physical interface and the load balancer.

13. The system of claim 12, further comprising:
a first VNIC interposed between the first physical interface and the first VNS; and
a second VNIC interposed between the second physical interface and the second VNS.

* * * * *